United States Patent Office 3,047,575
Patented July 31, 1962

3,047,575
NEW HETEROCYCLIC ORTHOQUINONES
Richard J. Boyle, Neshanic, N.J., Oscar G. Birsten, New York, N.Y., and William L. Mosby, North Plainfield, N.J., assignors to American Cyanamid Company, New York, N.Y., a corporation of Maine
No Drawing. Original application Apr. 4, 1958, Ser. No. 726,346, now Patent No. 2,970,146, dated Jan. 31, 1961. Divided and this application Nov. 29, 1960, Ser. No. 72,285
4 Claims. (Cl. 260—256.4)

This invention relates to new compounds which are orthoquinones of new heterocyclic ring systems and to azines derived therefrom. As such, this application constitutes a division of our copending application Serial No. 726,346, filed April 4, 1958, now U.S. Letters Patent No. 2,970,146.

More particularly, the orthoquinones are compounds of the formula

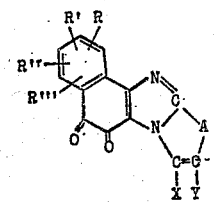

in which A may be —S—, —CH=CH—, or —CH=N—; X and Y may be either both hydrogen or lower alkyl or one hydrogen and the other lower alkyl or jointly the group —CH=CH—CH=CH—, and R, R', R", and R''' may be hydrogen, bromine, chlorine, nitro, or hydroxy.

Still more particularly, this application relates to the azines derived therefrom as new compounds of the formula

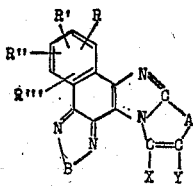

in which A, X, Y, R, R', R" and R''' are defined as above and B is a carbocyclic ring system of not more then three six-membered rings to which the nitrogens are linked through vicinal carbons. These new compounds of our invention can be used as vat dyes and as pigments.

The compounds of the above structural formulae which form our invention can be illustrated by the following compounds to which the approxed Chemical Abstract name is given:

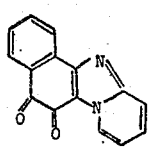

Naphtho [1',2',4,5] imidazo [1,2-a] pyridine-5,6-dione

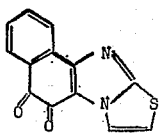

Naphtho [1',2',4,5] imidazo [2,1-b] thiazole-5,6-dione

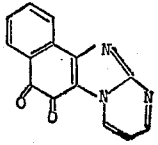

Naphtho [1',2',4,5] imidazo [1,2-a] pyrimidine-5,6-dione

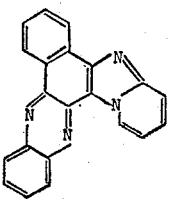

Benzo [a] pyrid [1',2',1,2] imidazo [4,5-c] phenazine

The quinone compounds of our invention are prepared by condensing a 2,3-dihalo-1,4-naphthoquinone, preferably the 2,3-dichloro compound, with an amino nitrogen-heterocyclic compound carrying an amino group linked to a carbon adjacent to the heterocyclic nitrogen. This reaction can be illustrated by the following schematic equation in which A, X and Y have the same meaning as before:

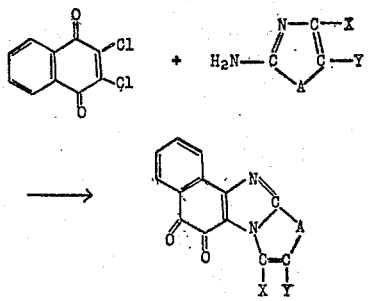

The reaction is carried out by heating the naphthoquinone derivative with the aminoheterocyclic compound in an organic solvent. An acid acceptor should be present to take up the hydrogen halide liberated. This may be either an extra mole of the aminoheterocyclic compound or it can be an alkaline reagent such as sodium carbonate. Solvents such as ethanol, ethoxyethanol, methoxyethanol and the like are readily usable.

The phenazine products of our invention are obtained by treatment of the quinones obtained above with orthodiamines. With the simpler orthodiamines, as for example orthophenylenediamine, the phenazine derivative is readily obtained directly. With the more complicated diamines, as for example 1,2-diaminoanthraquinone, an intermediate anil is formed which in turn may be ring-closed to the phenazine by vigorous treatment with a ring-closing agent such as polyphosphoric acid.

Among the 1,4-naphthoquinones which may be used as a starting material in the preparation of the compounds of our invention, there may be mentioned 2,3-dichloro-1,4 - naphthoquinone, 2,3-dibromo-1,4-naphthoquinone, 2,3,5,8-tetrachloro - 1,4 - naphthoquinone, 5-nitro-2,3-dichloro - 1,4 - naphthoquinone, 2,3-dibromo-5-hydroxy-1,4-naphthoquinone 2,3,6-tribromo-5-hydroxy - 1,4 - naphthoquinone, 2,3,5,8-tetrabromo-1,4-naphthoquinone, 2,3,5-trichloro - 1,4 - naphthoquinone, 2,3-dichloro-5-bromo-1,4-naphthoquinone, 2,3,6,7 - tetrabromo-1,4-naphthoquinone, and 2,3,5,6,7,8-hexachloro-1,4-naphthoquinone.

The aminoheterocyclic compounds which may be used in the condensation described above to form the compounds of our invention include the following:

2-aminopyridine
2-amino-3-methylpyridine
2-amino-4-methylpyridine
2-amino-5-methylpyridine
2-amino-6-methylpyridine
2-amino-5-chloropyridine
2-amino-4,6-dimethylpyridine
2-amino-5-nitropyridine
2-amino-3-bromopyridine
2-amino-4-bromopyridine
2-amino-5-bromopyridine
2-amino-3-bromo-5-nitropyridine
2-amino-6-chloropyridine
2-amino-3-chloro-5-nitropyridine
2-amino-3,4-dibromopyridine
2-amino-3,5-dibromopyridine
2-amino-5-iodopyridine
2-amino-5-bromo-3-nitropyridine
2-amino-6-chloro-3-phenylpyridine
2-amino-4-ethylpyridine
2-amino-6-bromopyridine
2-amino-3-iodopyridine
2-amino-4-iodopyridine
2-amino-6-ethoxypyridine
2-amino-5-ethoxypyridine
2-amino-3,5-dinitropyridine
2-amino-3,5-dichloropyridine
2-amino-3,4-dichloropyridine
2-amino-4-chloropyridine
2-amino-3-chloropyridine
2-amino-3,5-diodopyridine
2-aminoquinoline
2-amino-8-ethoxyquinoline
2-amino-3-phenylquinoline
2-amino-6-methylquinoline
2-amino-8-methylquinoline
2-amino-6-methoxy-3-phenylquinoline
2-amino-8-methoxy-3-phenylquinoline
2-aminopyrimidine
2-amino-4-methylpyrimidine
2-amino-4-isobutylpyrimidine
2-amino-4-ethylpyrimidine
2-amino-4-ethoxypyrimidine
2-amino-4-amylpyrimidine
2-amino-4-methyl-5-amylpyrimidine
2-amino-4-chloropyrimidine
2-amino-5-butylpyrimidine
2-amino-4-t-butylpyrimidine
2-amino-5-chloropyrimidine
2-amino-5-chloro-4,6-dimethylpyrimidine
2-amino-4-chloro-6-ethoxypyrimidine
2-amino-4-chloro-6-ethylpyrimidine
2-amino-4,6-diethoxypyrimidine
2-amino-4,6-diodopyrimidine
2-amino-4-methoxypyrimidine
2-amino-4-hexylpyrimidine
2-amino-4-methyl-5-ethylpyrimidine
2-amino-4,6-diphenylpyrimidine
2-amino-4,6-dipropoxypyrimidine
2-amino-4-chloro-6-methylpyrimidine
2-amino-4,6-dichloropyrimidine
2-amino-4,6-dimethylpyrimidine
2-aminothiazole
2-aminoquinoxaline
2-aminopyrazine
2-aminoxazole
2-aminobenzoxazole
and the like.

It is to be noted that by starting with a nitro dichloro-1,4-naphthoquinone, a nitro compound is obtained. However, alternatively, the nitro group may be introduced by nitration after the compounds of our invention have been formed. This is accomplished by the standard nitration procedure with a mixed acid. Similarly, the compounds can be sulfonated. Either the sulfonic acids or amines so produced can be subjected to the standard replacement reactions of aromatic chemistry, such as replacement of amine by hydroxyl, or halogens (chlorine, bromine or iodine), cyano, mercapto, and the like, by the Sandemeyer route.

The quinonoid products of our invention are vat dyes and by the usual vatting procedure can be used to dye cotton. The phenazine derivatives of these vat dyes are colored compounds with very low solubility, and consequently are quite useful as pigments.

Our invention can be further illustrated by the following examples in which parts are by weight unless otherwise specified.

*Example 1*

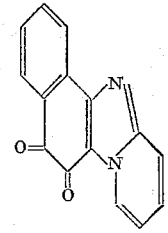

A mixture of 68.1 parts of 2,3-dichloro-1,4-naphthoquinone, 56.4 parts of 2-aminopyridine and 450 parts of ethanol is heated with stirring at the reflux temperature until the reaction is substantially complete and then allowed to cool to room temperature. The product is removed by filtration, washed with alcohol and dried. The crude product can be purified by recrystallization from chlorobenzene and ortho dichlorobenzene. This quinone dyes cotton a light yellow shade from a bright red vat.

If equivalent quantities of 6-methyl-2-aminopyridine are used, a corresponding product carrying a methyl group in the hetero-ring is obtained. Similarly, equivalent quantities of 2-amino-5-chloro, bromo, or iodopyridine or 2-amino-6-ethoxypyridine give the corresponding substituted product.

*Examples 2–7*

Using the procedure shown above in Example 1 and in our above-noted U.S. Patent No. 2,970,146, the following compounds were prepared:

| Ex. No. | Compound | Dyed Fabric Color |
|---|---|---|
| 2 | naphtho [1',2'-4,5] imidazo [1,2-a] quinoline-5,6-dione. | orange. |
| 3 | 8-nitro-naphtho [1',2'-4,5] imidazo [1,2-a] pyridine-5,6-dione. | yellow. |
| 4 | 1,4-dichloro-naphtho [1',2'-4,5] imidazo [1,2-a] pyridine-5,6-dione. | Do. |
| 5 | naphtho [1',2'-4,5] imidazo [1,2-a] pyrimidine-5,6-dione. | light yellow. |
| 6 | 3-nitro-naphtho [1',2'-4,5] imidazo [1,2-a] pyridine-5,6-dione. | green. |
| 7 | naphtho [1',2'-4,5] imidazo [2,1-b] thiazole-5,6-dione. | grayish-brown |

*Example 8*

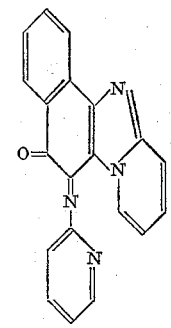

A mixture of 22.7 parts of 2,3-dichloro-1,4-naphthoquinone, 37.6 parts of 2-aminopyridine and 180 parts of ethanol is heated at the reflux temperature with stirring until the reaction is substantially complete. After cooling to room temperature, the product which forms is removed by filtration, washed thoroughly with alcohol, and dried. Recrystallization from chlorobenzene gives the pure reddish-brown anil, which is hydrolyzed by dilute sulfuric acid to give the product of Example 1.

*Example 9*

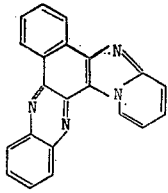

A mixture of 4.96 parts of the product obtained in Example 1, 2.16 parts of orthophenylene diamine and 75 parts of glacial acetic acid is heated at the reflux temperature with stirring until the reaction is substantially complete and then allowed to cool to room temperature. The bright yellow product which forms is removed by filtration, washed with alcohol and dried. By recrystallization from chlorobenzene and methoxyethanol, the pure phenazine is obtained.

*Example 10*

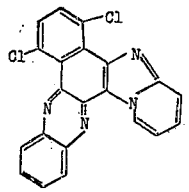

A mixture of about 275 parts methoxyethanol, 1.08 parts of orthophenylene diamine and 1.59 parts of the product as prepared in Example 4 is heated at the reflux temperature with stirring until the reaction is substantially complete. After cooling, the solid product is removed by filtration, washed with alcohol and dried. The crude product is purified by recrystallization from chlorobenzene to give a gold colored product.

*Example 11*

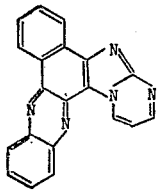

A mixture of 0.5 part of the compound prepared in Example 5, 0.25 part of othophenylene diamine, and 35 parts of glacial acetic acid is stirred at the reflux temperature until the reaction is substantially complete and is then allowed to cool to room temperature. The solid product which forms is removed by filtration, washed with alcohol and dried. The crude product is recrystallized from chlorobenzene to give the pure yellow phenazine.

*Example 12*

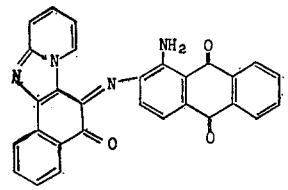

A mixture of 1.75 parts of the product whose preparation is described in Example 1, 2.5 parts of 1,2-diaminoanthraquinone and 75 parts of glacial acetic acid is stirred at the reflux temperature until the reaction is substantially complete. The solid material which formed is removed by filtration, washed with alcohol and dried. Recrystallization from trichlorobenzene gives the pure violet anil. The anil is ring-closed to the phenazine derivative by heating in polyphosphoric acid, followed by drowning in water.

We claim:
1. The compounds of the formula

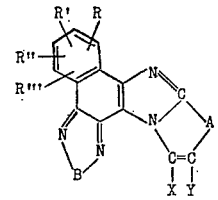

in which A is selected from the group consisting of —S—, —CH=CH—, and —CH=N—, X and Y are selected from the group consisting of hydrogen, and lower alkyl and, taken together, the group —CH=CH—CH=CH—, R, R', R" and R"' are selected from the group H, Cl, Br and $NO_2$ and in which B is selected from the group consisting of phenyl and anthraquinonyl to which the nitrogens are linked at adjacent carbons.

2. The compound of the structure

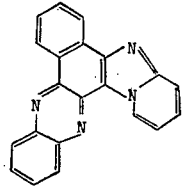

3. The compound of the structure

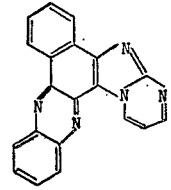

4. The compound of the structure

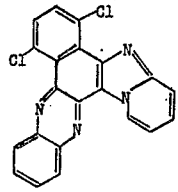

No references cited.